United States Patent

Hughes et al.

[11] Patent Number: 5,957,982
[45] Date of Patent: Sep. 28, 1999

[54] METHOD AND SYSTEM FOR SPACE NAVIGATION

[75] Inventors: George C. Hughes, Manhattan Beach; Michael J. Wehner, Hawthorne; Mark L. Hanson, Redondo Beach; D. Hobson Lane, Hermosa Beach; Paul A. Lavoie, Manhattan Beach; Warren H. Taylor, Gardena; Bryan H. Kang, La Mirada; Paul Steiner, Rancho Palos Verdes; Arnold J. Galloway, Los Angeles, all of Calif.; Michael Busby, Reno, Nev.

[73] Assignee: TRW Inc., Redondo Beach, Calif.

[21] Appl. No.: 09/135,884

[22] Filed: Aug. 18, 1998

[51] Int. Cl.⁶ .................................................. G06F 15/00
[52] U.S. Cl. .................................................. 701/13; 701/4
[58] Field of Search .................................. 701/13, 4, 200, 701/255, 6; 342/354, 5, 357, 8, 357.01, 357.16, 357.15, 357.02; 455/12.1, 13.2, 427; 244/158 R

[56] References Cited

U.S. PATENT DOCUMENTS

5,109,346  4/1992  Wertz ........................................ 701/13
5,528,502  6/1996  Wertz ........................................ 701/13
5,717,404  2/1998  Malla ....................................... 342/352

Primary Examiner—William A. Cuchlinski, Jr.
Assistant Examiner—Yonel Beaulieu
Attorney, Agent, or Firm—Michael S. Yatsko

[57] ABSTRACT

A method that allows a space vehicle to determine navigation information represented by the contents of a state vector. The method includes the steps of intermittently receiving navigation signals, initializing the state vector with an estimate of the navigation information, and generating a predicted state vector that represents the predicted values for the navigation information after a predetermined time increment in the future. The method further determines whether a navigation signal has been received within a predetermined window of time from a navigation beacon. If a navigation signal has been received, the method updates the state vector and the contents of the state vector are propagated forward in time to provide an estimate of the navigation information after a predetermined time increment. In some instances, however, a navigation signal is not received within the predetermined window of time. In such situations, the method simply propagates the contents of the predicted state vector forward in time. Thus, the predicted state vector maintains an estimate of the current navigation information even in the absence of a navigation signal.

26 Claims, 6 Drawing Sheets

Frequency Standard Noise Coefficients

| Noise Type | RAFS | | FTS 9500 | | FTS 9720 | |
|---|---|---|---|---|---|---|
| | Allan Deviation | Power Spectrum | Allan Deviation | Power Spectrum | Allan Deviation | Power Spectrum |
| Frequency White Noise | $3 \times 10^{-12} \, T^{-1/2}$ | $h_0 = 1.8 \times 10^{-23}$ | $3 \times 10^{-12} \, T^{-1/2}$ | $h_0 = 1.8 \times 10^{-23}$ | $3 \times 10^{-12} \, T^{-1/2}$ | $h_0 = 1.8 \times 10^{-23}$ |
| Frequency Flicker | $5 \times 10^{-14} \, T^0$ | $h_{-1} = 1.8 \times 10^{-27}$ | $2.5 \times 10^{-12} \, T^0$ | $h_{-1} = 4.5 \times 10^{-24}$ | $5 \times 10^{-12} \, T^0$ | $h_{-1} = 1.8 \times 10^{-23}$ |
| Frequency Random Walk | $3 \times 10^{-16} \, T^{1/2}$ | $h_{-2} = 1.4 \times 10^{-32}$ | $1.7 \times 10^{-13} \, T^{1/2}$ | $h_{-2} = 4.2 \times 10^{-27}$ | $8.5 \times 10^{-13} \, T^{1/2}$ | $h_{-2} = 1.1 \times 10^{-25}$ |
| Frequency Ramp | $1.5 \times 10^{-19} \, T$ | $h_{-3} = 9 \times 10^{-38}$ | $6 \times 10^{-16} \, T$ | $h_{-3} = 1.44 \times 10^{-30}$ | $6 \times 10^{-15} \, T$ | $h_{-3} = 1.44 \times 10^{-28}$ |

Figure 3

Allen Deviation Equations $$\left(\frac{\Delta F}{F_0}\right)\sigma_y(T) = \left(\frac{h_0}{2}\right)^{\frac{1}{2}} T^{-\frac{1}{2}} + (2\ell n h_{-1})^{\frac{1}{2}} + \left(\frac{\pi^2}{3} h_{-1}\right)^{\frac{1}{2}} T^{\frac{1}{2}} + \left(\frac{h_{-3}}{4}\right)^{\frac{1}{2}} T$$

$$(SEC)\sigma_x(T) = \left(\frac{h_0}{2}\right)^{\frac{1}{2}} T^{\frac{1}{2}} + (2\ell_n h_{-1})^{\frac{1}{2}} T + \left(\frac{\pi^2}{3} h_{-1}\right)^{\frac{1}{2}} T^{\frac{3}{2}} + \left(\frac{h_{-3}}{4}\right)^{\frac{1}{2}} T^2$$

Where $$H_0 = \frac{\left(\frac{\Delta F}{F_0}\right)^2}{Hz} = \left(\frac{\Delta F}{F_0}\right)^2 SEC$$

$$H_{-1} = \left(\frac{\Delta F}{F_0}\right)^2 = \left(\frac{\Delta F}{F_0}\right)^2$$

$$H_{-2} = \left(\frac{\Delta F}{F_0}\right)^2 Hz = \frac{\left(\frac{\Delta F}{F_0}\right)^2}{SEC}$$

$$H_{-3} = \left(\frac{\Delta F}{F_0}\right)^2 Hz^2 = \frac{\left(\frac{\Delta F}{F_0}\right)^2}{SEC^2}$$

METHOD AND SYSTEM FOR SPACE NAVIGATION

BACKGROUND OF THE INVENTION

The present invention relates to an autonomous space navigation system. In particular, the present invention relates to a method and apparatus for accurately determining in real time the location of a spacecraft using sequentially received positioning information.

The location of a spacecraft (or any other vehicle, for that matter) is often of critical importance. The location of the spacecraft, for example, may determine its ability to achieve scientific research goals and to communicate important information to Earth, or other spacecraft. Furthermore, the location of a spacecraft is required to determine the spacecraft trajectory and therefore its future location as well as to plan changes in the trajectory to send the spacecraft to a desired location.

In the past, the navigation information required to determine the location of a spacecraft has often been generated on the ground. Thus, for example, ground stations typically obtain ranging information using a ground to spacecraft communications link (and, for example, the signal time delay present in the information carried by the link). Ground processing of the navigation information, however, is time consuming and expensive due to the number of ground stations required and the volume of information to be processed.

Deep space missions, for example, would require significant amounts of Deep Space Network (DSN) time to provide accurate location information. As a particular example, the Space Interferometry Mission (SIM), slated for launch in 2004, includes an optical interferometer operating in an Earth trailing holocentric orbit. The DSN, which is a ground based phased array of radio telescopes currently run by NASA, requires approximately 18 hours of DSN time per week to meet accuracy requirements for the SIM. At approximately $1700 per hour for a 37 meter DSN antenna, over $5,000,000 is required to maintain accurate positioning information over the expected 5 year SIM mission.

Furthermore, even when ground stations accurately track the position of a spacecraft, the ground stations become a vital link in the spacecraft's operation. Thus, the ground stations become prime targets for attack during hostilities, including nuclear strikes, as well as more subtle sabotage. In fact, any ground based solution to spacecraft tracking is open to such attacks.

Another attempt at providing location information (primarily for ground based systems) includes the use of Global Positioning Systems (GPS). GPS satellites, located in medium earth orbit (MEO) direct their signals down toward the surface of the earth. The GPS satellites thereby provide range and range rate information in their signals (provided, for example, using propagation delay and Doppler shift characteristics of the transmitted signals).

A ground based receiver, able to gather GPS signals simultaneously from four GPS satellites, may determine its position using the range and range rate information as well as knowledge (provided in the GPS signal) of the particular GPS satellite that transmitted the signal and that GPS satellite's broadcast location. Any spacecraft, of course, that travels beyond MEO altitude (including a common GEO satellite), cannot rely on continually receiving four GPS signals simultaneously to determine its location. In other words, the GPS satellite orbits and antenna pointing is designed to provide simultaneous coverage of the Earth, not the infinity of space.

A need has long existed in the industry for an accurate autonomous spacecraft navigation and positioning system.

BRIEF SUMMARY OF THE INVENTION

It is an object of the present invention to determine navigation information for a vehicle.

It is another object of the present invention to determine navigation information for a vehicle using navigation signals received from a navigation beacon. Examples of navigation beacons include GPS satellites, GLONASS satellites, and pseudo-lites.

Yet another object of the present invention is to allow a vehicle to determine its position and other navigation information without requiring simultaneous reception of multiple navigation signals.

Another object of the present invention is to allow a vehicle to accurately propagate its navigation information forward in time even in the absence of navigation signals.

Yet another object of the present invention is to allow a vehicle to determine its navigation information autonomously and without the aid of ground based processing.

The preferred embodiment of the present invention provides a method that allows a space vehicle to determine navigation information represented by the contents of a multi-element state vector, even in the presence of intermittently received navigation signals. The space vehicle may, for instance be in Earth orbit, or in deep space well beyond, for example, MEO orbit altitude. The state vector may include for example, position and velocity information for the vehicle. Additionally, the state vector may include other regularly updated parameters, including clock bias and clock drift (i.e., the rate of change of the bias in the clock).

The method includes the steps of initializing a state vector with an estimate of the navigation information and generating a predicted state vector that represents the predicted values for the navigation information after a predetermined time increment in the future. The method further determines whether a navigation signal has been received.

If a navigation signal has been received, the method updates the state vector based on the current contents of the state vector itself, the predicted state vector, and the information contained in the navigation signal. Additionally, the contents of the state vector are propagated forward in time (and used in subsequent iterations) to form a predicted state vector to provide an estimate of the navigation information after a predetermined time increment.

In some instances, however, a navigation signal is not received within a predetermined window of time. In such situations, the method propagates the contents of the predicted state vector forward in time. Thus, the predicted state vector maintains an estimate of the current navigation information even in the absence of a navigation signal. The navigation signal is generally provided by a navigation beacon.

DETAILED DESCRIPTION OF THE INVENTION

Figure 1:
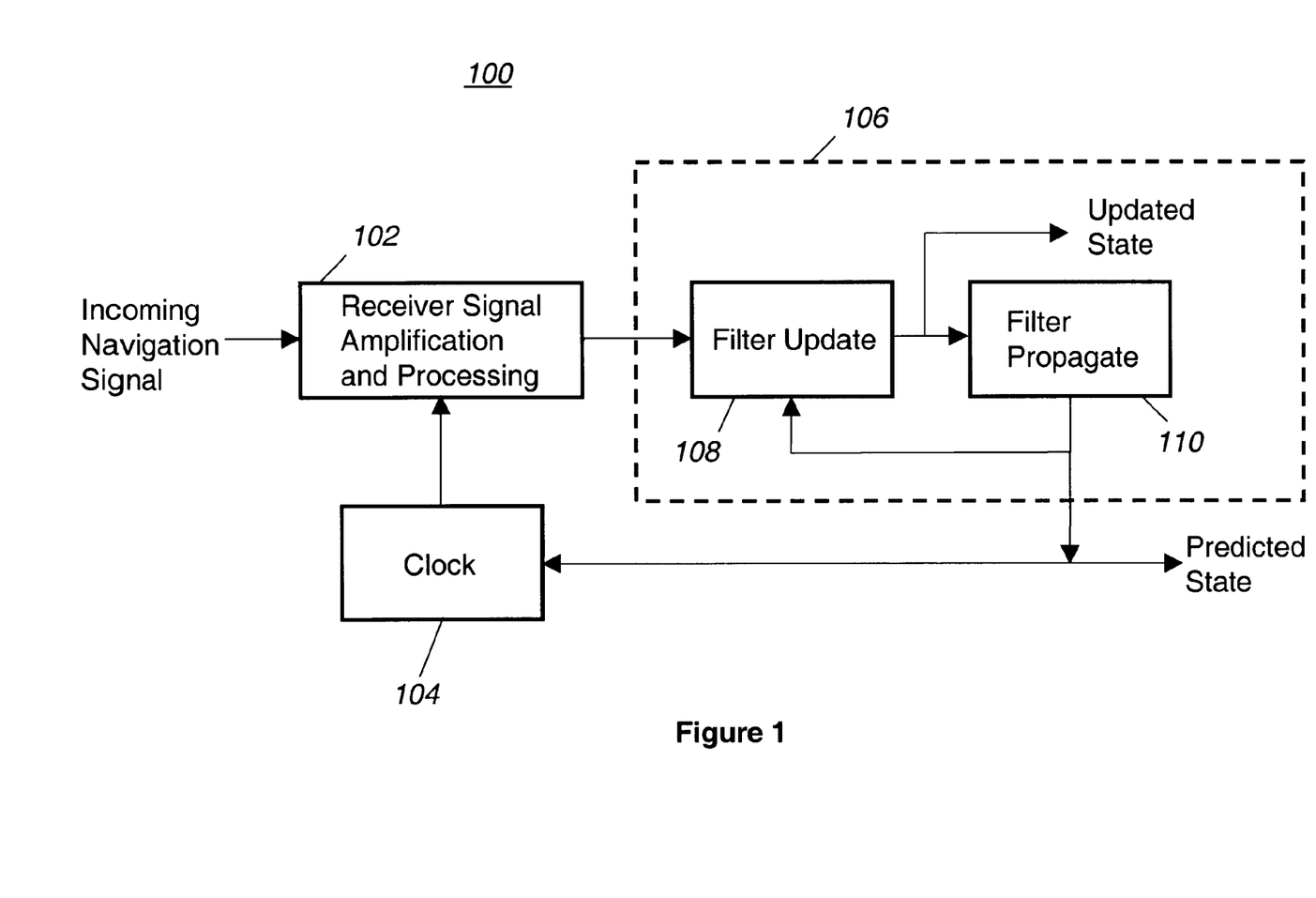
FIG. 1 illustrates a block diagram of an update and propagate structure that may be used to maintain and estimate navigation information.

Turning now to FIG. 1, that figure generally illustrates an update (incorporating measurements) and propagate (using a dynamic model) structure 100 that may be used to maintain and estimate navigation information. The structure 100 includes a receiver 102 connected to a clock 104, as well as a filter 106. The filter 106, in turn, generally includes a filter update section 108 and a filter propagate section 110. As illustrated in FIG. 1, the filter update section 108 produces an updated state and the filter propagate section 110 produces a predicted state.

Figure 2:
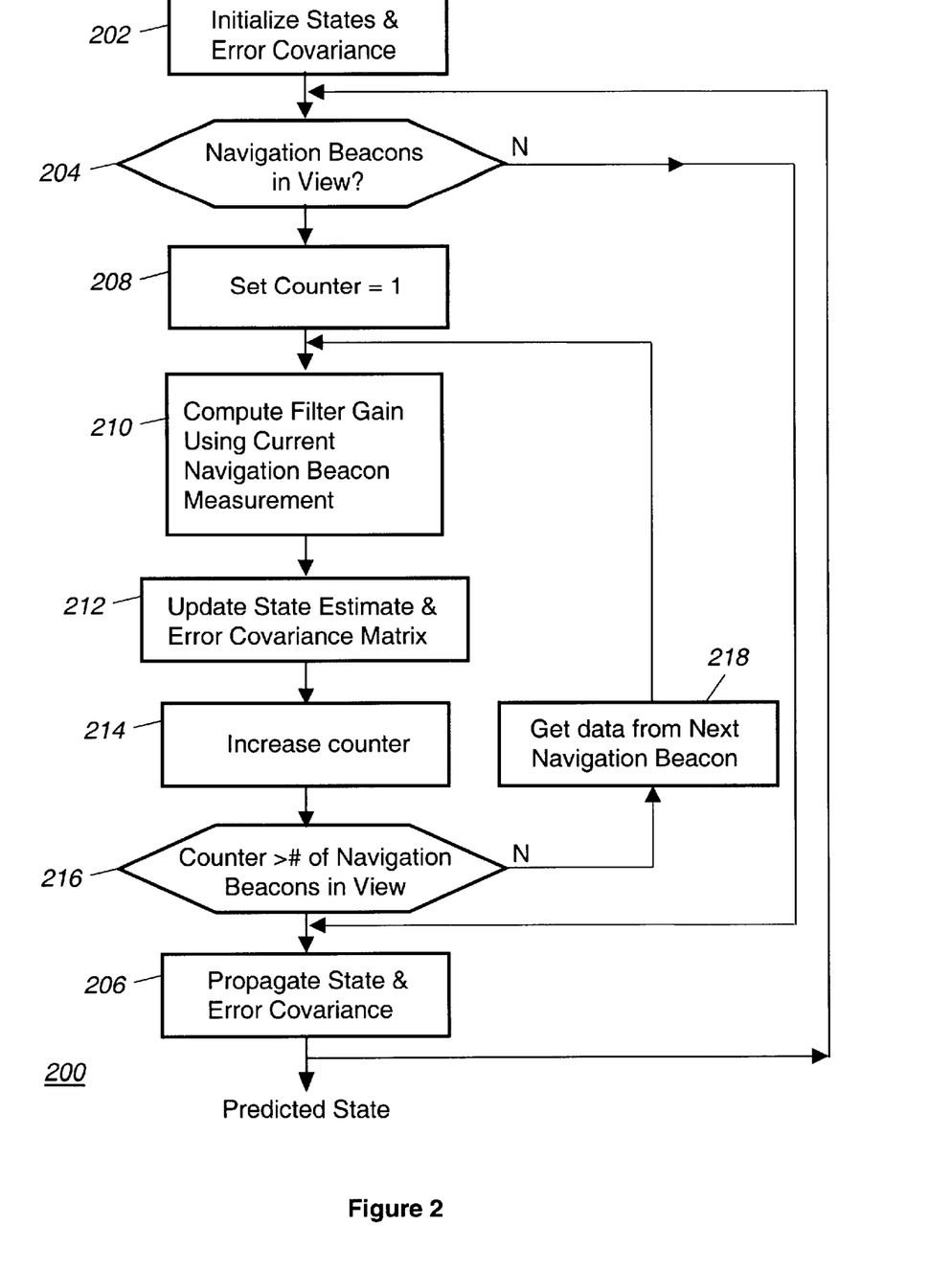
FIG. 2 shows a flow chart of the processing steps used to maintain and estimate navigation information.

With reference to FIG. 2, an overview of the processing steps used to generate the updated state and the predicted state is presented. The flowchart 200 in FIG. 2 begins with step 202, in which the state vector and covariance matrix (discussed in more detail below) are initialized. Thus, for example, the state vector may be initialized shortly after launch of a spacecraft with an estimate of the current position, velocity, clock bias, and clock drift. Similarly, the measurement noise covariance matrix may be initialized with the covariances of noise terms (e.g., navigation signal reception correlation uncertainty) in the receiver 102.

Continuing, step 204 determines whether any navigation beacons are in view. Without new information provided by a navigation signal transmitted by a navigation beacon, the processing continues at step 206. At step 206, the contents of the state vector and covariance matrix are propagated ahead by a predetermined time interval, for example, 1 second. A new predicted state is thereby produced. Subsequently, processing returns to step 204.

Assuming that at least one navigation beacon is in view and that its signal has been received, the processing continues at step 208. Step 208 simply initializes a counter that is used in a loop structure to analyze each of the navigation signal available. Thus, continuing at step 210 (and as discussed in more detail below), the first navigation signal is processed to extract range, range rate, beacon position, clock, and additional information and a filter gain is determined. Before computing the filter gain, the state vector is propagated to the measurement time.

At step 212, the filter gain is used to update the state vector as well as a covariance matrix. Step 212 generates the updated state vector based additionally on the predicted state (discussed below). Thus, an updated state vector is produced at step 212 to provide the current estimate of the state vector whenever possible (e.g., when a navigation signal is available), while step 206 generates estimates of the state vector (and covariance matrix) as time goes by, with or without a navigation signal.

Continuing at step 214, the counter increments and is compared at step 216 to the number of navigation beacons in view (i.e., the number of navigation signals available). If the available navigation signals have not been exhausted, step 218 extracts the navigation information noted above from the next navigation signal (which in general may be queued up in memory for processing). Subsequently, processing returns to step 210 to continue updating the state vector.

If all available navigation signals have been examined, the processing continues at step 206, which propagates the state vector and covariance matrix forward by a predetermined time interval, and processing resumes at step 204. The feedback thereby provided allows the filter to autonomously adjust its filter gain and covariance matrix as shown by the equations presented below. The filter is thereby self-correcting and requires no outside intervention to maintain accurate propagation of the state vector.

The current state is typically treated as an n-element vector, with each element corresponding to a particular piece of navigation information. As an example, the state vector may be: [x, y, z], representing x, y, and z components of a location in a rectangular coordinate system. The particular coordinate system may be chosen freely, however. Thus, for spacecraft, the coordinate system may be the J2000 coordinate system or the Earth Centered Inertial, True of Date coordinate system. Furthermore, a vehicle which is updating and propagating its navigation information in a particular coordinate system may use navigation signals carrying information in a different coordinate system simply by translating the information to the coordinate system desired.

The preferred state vector (discussed below) includes eight components: a three element position (r vector), a three element velocity (v vector) used in part to propagate the position forward, a clock bias, and a clock drift used to propagate the clock bias forward. The clock bias represents the difference between the vehicle clock and an absolute reference clock, while the clock drift represents the rate of change of the clock bias. The preferred state vector (in general, subscripts on vector terms indicate the number of rows and columns in the vector) for the particular embodiment used below is thus:

$$x_{[8 \times 1]} = \begin{bmatrix} r_{[3 \times 1]} \\ v_{[3 \times 1]} \\ t_{bias\_pred} \\ t_{drift\_pred} \end{bmatrix} \quad (1)$$

Referring again to FIG. 1, the receiver 102 performs several functions. Beyond simply receiving incoming signals, the receiver 102 generally amplifies and processes the incoming signals. In particular, the receiver processes navigation signals.

As one example, the navigation signals may be provided by GPS satellites in MEO orbit. As noted above, GPS satellites are directed toward ground based coverage. However, as the GPS satellites move through their orbits, portions of their signals propagate not only down to the Earth's surface, but also out into space. In other words, the expanding wavefront of the GPS navigation signal extends beyond the periphery of the Earth and therefore passes or escapes around the Earth and into space.

In general, a spacecraft beyond MEO orbit cannot see enough GPS satellites simultaneously and consistently in order to determine its position. The spacecraft can periodically receive 0, 1, 2, or more navigation signals from GPS satellites at various times with various delays between reception of a new navigation signal. Even in the presence of such intermittent reception, however, the present navigation system accurately updates and autonomously propagates (i.e., without any intervention in the absence of navigation signals) the navigation information in the state vector. The filter update section 108 and filter propagate section 110 allow the spacecraft to determine and maintain its navigation information while receiving navigation signals from a varying number of GPS satellites.

Alternatively, the navigation signal may be provided by one or more pseudo-lites on the Earth, or in Earth orbit. A pseduo-lite provides, typically, the same information that a GPS navigation signal provides. In general, however, any transmitter (referred to below as a navigation beacon) that provides the information required to update and propagate a state vector may be used. The particular information present in the navigation signal used to update and propagate the preferred state vector is described in more detail below.

The receiver 102 may, for example, directly recover a navigation beacon ID (indicating the particular navigation beacon that sent the navigation signal), a navigation beacon time stamp (indicating the time at which the present navigation signal was transmitted from the navigation beacon), a navigation beacon satellite position (e.g., a 3 element position vector for the navigation beacon itself), and a navigation beacon satellite velocity (e.g., a 3 element velocity vector for the navigation beacon itself). The local time (according to the clock 104) at which the spacecraft received the navigation signal is used to determine (using a general purpose processor, for example) additional information used in the filter update section 108 and filter propagate section 110.

The processor may determine the range between the spacecraft and the navigation beacon, for example, by determining the difference between the local time and the time stamp and multiplying by the navigation signal propagation speed, typically the speed of light. Similarly, the processor may determine the range rate (the relative velocity between the navigation beacon and the spacecraft) by examining the Doppler shift present in the navigation beacon when received. The Doppler shift is determined in accordance with the signal beacon position and velocity and the spacecraft state vector to determine the correct direction and magnitude of the Doppler shift (and thus the range rate).

Figure 3:
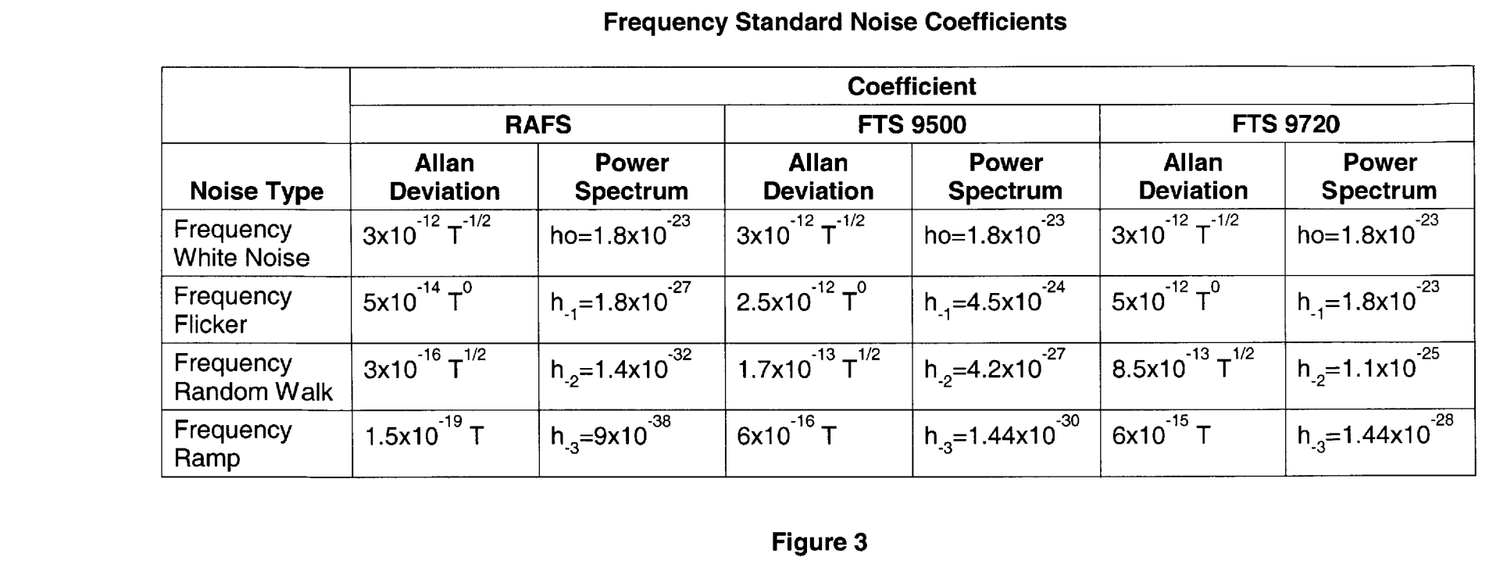
FIG. 3 shows a table of noise figures for several clocks suitable for use with the present invention onboard a spacecraft.

As noted above, the clock 104 provides a local time source for the spacecraft. The clock 104 may be implemented, for example with a Frequency and Time Standard (FTS) 9720 clock, although more or less stable clocks are also suitable (e.g., an FTS 9500 or EG&G RAFS atomic clock). FIG. 3 provides exemplary noise FIGS. 300 for several clocks that are suitable for use in a spacecraft.

Figure 4:
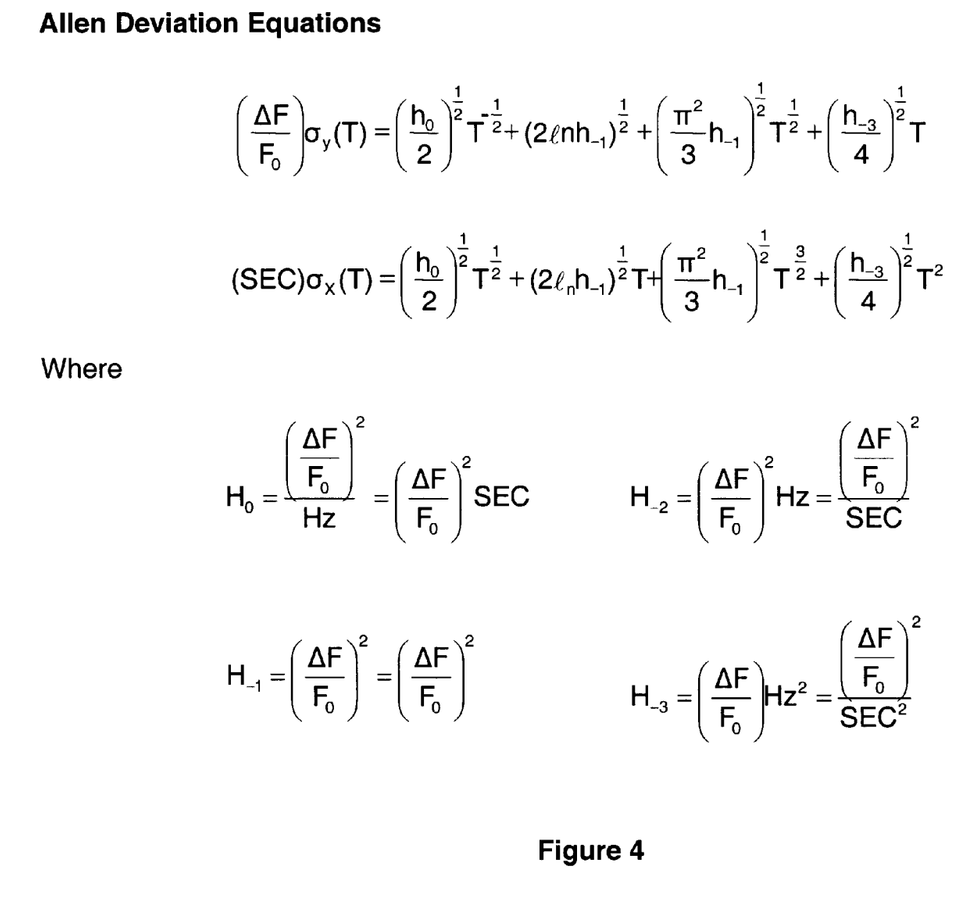
FIG. 4 depicts the Allan Deviation equations used to determine a Frequency Standard Model for the clocks tabulated in FIG. 3.

The noise FIGS. 300 show the four most important sources of inaccuracy and instability for each particular clock: Frequent White Noise ($h_0$), Frequency Flicker ($h_{-1}$), Frequency Random Walk ($h_{-2}$), and Frequency Ramp ($h_{-3}$). The resulting Allan deviation terms (as calculated according to the Allan Deviation Equations (FIG. 4) which provide frequency standard clock models are also shown.

Returning to FIG. 1, the filter 106 (preferably a Kalman filter) uses the filter update section 108 to update the state vector and thereby the navigation information represented in the state vector. When a navigation signal arrives, the filter update section 108 generally updates the state vector with the aid of the range and range rate, current state vector, and a predicted state vector (described below). However, if a navigation signal is not received with a predetermined window of time (e.g., 1 second), the filter propagate section 110 propagates (or generates for the first time) a predicted state vector forward by an independent time interval, which need not remain constant.

The predicted state vector includes the same information used in the state vector itself. The predicted state vector, however, contains a prediction of the navigation information after a predetermined time interval. Thus, for example, the filter propagator section 110 may predict the navigation information ahead in 1 second increments. In other words, in the absence of a navigation signal, the propagator section 110 uses information in the current state vector (e.g., velocity information) to predict the state vector a predetermined time interval in the future. In the absence of navigation signals (i.e., as time windows elapse without navigation signals), the filter propagator section 110 continues to update the predicted state vector.

When a navigation signal arrives, the filter update section 108 updates the state vector using the last determined state vector, the predicted state vector, and information present or determined using the navigation signal (e.g., the range and range rate). Furthermore, the filter update section 108 updates the parameters used to determine the state vector, as will be described in more detail below. First, however, the equations generally governing the operation of the filter are presented in Table 1. It is noted that additional formulations of an extended Kalman filter and other non-linear filters, are also applicable.

TABLE 1

| System | $\dot{\underline{X}} = \underline{f}(\underline{X}) + G\underline{w}$ |
|---|---|
| Measurement Model | $\underline{z}_k = \underline{h}_k(\underline{X}_k) + \underline{v}_k$ |
| State Estimate Propagation | $\dot{\underline{X}} = \underline{f}(\underline{X})$ |
| Error Covariance Propagation | $\dot{P} = AP + PA^T + G^TQG$ |
| State Estimate Update | $\hat{\underline{X}}_k^+ = \hat{\underline{X}}_k^- + K_k(\underline{z}_k - \hat{\underline{z}}_k(\hat{\underline{X}}_k^-))$ |
| Error Covariance Update | $P_k^+ = (I - K_k H_k)P_k^-$ |
| Gain Matrix | $K_k = P_k^- H_k(H_k P_k^- H_k^T + R)^{-1}$ |

The equations in Table 1 are discussed in detail in estimation textbooks, for example, in Gelb, Arthur, *Applied Optimal Estimation*, Copyright 1972, The M.I.T. Press, Cambridge, Mass. In Table 1, X is a n×1 state vector, f(X) is an n×1 function of the state dynamics, G is an n×m noise transmission matrix, w is an m×1 vector of zero mean, Gaussian white noise, $z_k$ is an r×1 vector of navigation beacon measurements at time $t_k$, h is a non-linear function which relates the variables in the state vector to the measurements, v is a zero mean Gaussian noise source uncorrelated with w, P is an n×n state error covariance matrix, Q is an n×n spectral density matrix (representing, for example, the covariance of w), K is an n×r Kalman gain matrix, and R is an r×r measurement noise covariance matrix, and A is an n×n Jacobian matrix whose $ij^{th}$ element is $$A_{ij} = \frac{\partial}{\partial X_j} f_i(X)\bigg|_{X=\hat{X}} \tag{2}$$

The application of the equations, according to the present invention, to the determination of navigation information in an optimal way is detailed below.

The dynamic equations of motion for a spacecraft that receives and processes navigation signals may be expressed as:

$$\dot{X} = \begin{bmatrix} \underline{f}_{sc} \\ \underline{f}_{clock} \end{bmatrix} + \begin{bmatrix} \underline{w}_{sc} \\ \underline{w}_{clock} \end{bmatrix} \quad (3)$$

where $f_{sc}$ is the time derivative of the spacecraft (sc) states (i.e., position and velocity) in the J2000 coordinate system, $f_{clock}$ is the time derivative of the two clock states (i.e., clock bias and drift) in the spacecraft, and $w_{sc}$ and $w_{clock}$ are empirically determined white noise sources, associated, for example, with noise and uncertainty in decoding of the navigation signals and noise and uncertainty in the bias and drift in the spacecraft clock.

The $f_{sc}$ component may be approximated as:

$$\underline{f}_{sc} = \begin{bmatrix} \underline{\dot{R}} \\ \underline{\dot{V}} \end{bmatrix} = \begin{bmatrix} V \\ a_{Kepler} + a_{J2} + a_{sun} + a_{lunar} + a_{srp} \end{bmatrix} \quad (4)$$

where V is the 3×1 velocity vector, $a_{Kepler}$ is the acceleration due to a homogeneous spherical Earth, $a_{J2}$ is the acceleration due to Earth's bulge at the equator, $a_{sun}$ is the acceleration due to the Sun's gravitational pull, $a_{lunar}$ is the acceleration due to the moon's gravitational pull, and $a_{srp}$ is the acceleration due to solar radiation pressure.

The approximation given in equation (4) becomes nearly exact when higher order gravity terms and other third body perturbations (e.g., the planets) are included. Thus, for example, equation (4) may be used with, for example, a J50 gravity model and additional accelerations corresponding to the effect of the planet (or any other body) on the spacecraft. Furthermore, additional accelerations may be added to model, for example, delta V maneuvers (e.g., artificially introduced changes in velocity to achieve, for example, a new orbit) or the effect of reaction control system thrusters, if such accelerations are not negligible.

Equation (4), as presented, provides excellent accuracy for high altitude Earth satellites. As one particular example, a geosynchronous spacecraft may determine its position within 25–50 meters without additional acceleration models. In deep space missions or in elliptical orbits, additional terms may be added to achieve any desired level of navigation information (state vector) accuracy. As noted, equation (4) does not account for every possible source of influence over the spacecraft. A modeling error thus exists between the actual spacecraft navigation information and the filter model. The modeling errors are treated by the noise sources $w_{sc}$.

The clock may use the following dynamic model:

$$\underline{f}_{clock} = \begin{bmatrix} \dot{x}_1 \\ \dot{x}_2 \end{bmatrix} = \begin{bmatrix} 0 & 1 \\ 0 & 0 \end{bmatrix} \begin{bmatrix} x_1 \\ x_2 \end{bmatrix} = \begin{bmatrix} x_2 \\ 0 \end{bmatrix} \quad (5)$$

where $x_1$ is the clock bias, and $x_2$ is the clock drift. Equation (2) represents that the frequency and phase of the clock undergo random walks over short time periods. In other words, the clock drift is assumed not to drift itself, and thus the clock bias is changing at the constant rate of the clock drift. If this assumption is violated, a clock bias acceleration term may be added as an additional clock state parameter to be estimated.

Figure 5:
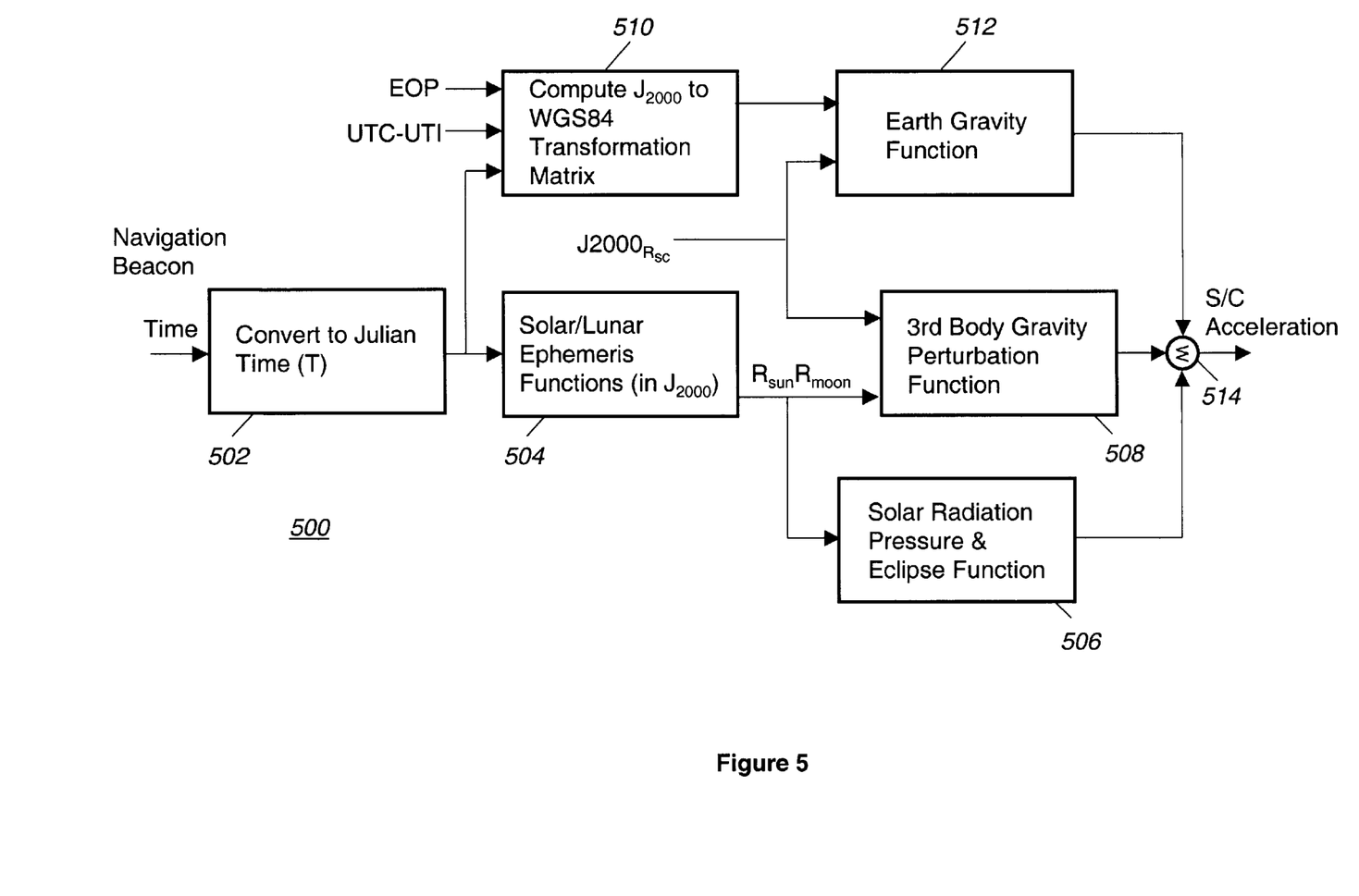
FIG. 5 shows one example of the processing flow for determining gravity and solar radiation pressure accelerations.

Turning now to FIG. 5, that figure shows one embodiment of the processing steps 500 involved in determining the accelerations of the components of equation (4). Initially, it is noted that the accelerations used in equation (4), as well as higher order gravity models and third body gravity models have been extensively tabulated and are available in geodesy textbooks. However, conversion between certain coordinate systems may be used depending on the standard used in the navigation signals and the standard used to represent the acceleration and ephemeris information (discussed in more detail below).

At step 502, the time stamp received in the navigation signal is converted to a Julian date. In turn, step 504 determines the position of the Sun and Moon ($R_{sun}$, $R_{moon}$) based on tabulated ephemeris data in the J2000 system. At step 506, the solar radiation pressure on the spacecraft is determined.

Typically, a simplified model may be used to determine a solar radiation pressure model. Thus, for example, the spacecraft may be modeled as an isotropic sphere with a partially reflective surface. The resultant pressure generated by the Sun's radiative flux (or absence of flux during eclipse periods) on the spacecraft may then be determined. The present invention is not limited to any particular pressure model, however, and additional, more exacting models, may be used without changing the development below.

At step 508, the accelerations due to the sun and moon are determined (with knowledge of the spacecraft position $R_{sc}$), as well as the accelerations due to other third bodies. Again, these accelerations may be determined by indexing tabulated data or evaluating Newtonian gravitational force calculations, shown below.

Furthermore, step 510 determines a J2000 to World Geodetic Survey 1984 (WGS 84 earth fixed) transformation matrix based on Earth Orientation Parameters (EOP) and the time offset between Coordinated Universal Time (UTC) and Universal Time referenced to actual Earth rotation. The transformation matrix allows the acceleration determinations shown in FIG. 5 to determine the spacecraft acceleration caused by the Earth in step 512. The accelerations are summed by step 514 to produce the complete acceleration term used in equation (4).

The individual acceleration terms are given below:

$$\underline{a}_{Kepler} = \frac{\mu}{r^3} \underline{R}_{sc} \quad (6)$$

where r (which is equal to $|R_{sc}|$) is the distance from the Earth's center to the spacecraft. $R_{sc}$ is the spacecraft or user position vector ($R_u$) in the J2000 frame, and $\mu$ is the gravitational parameter of the Earth.

Figure 6:
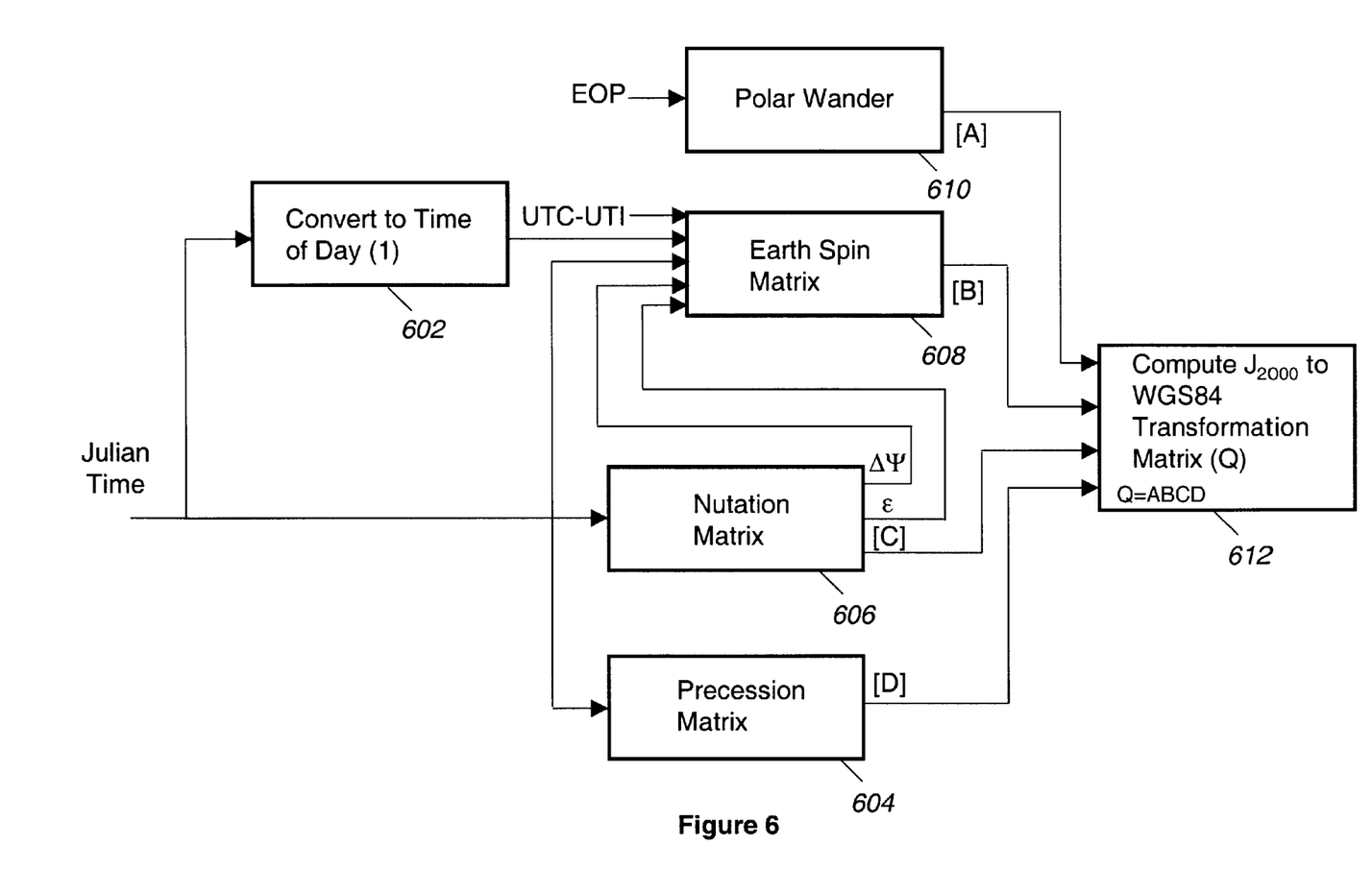
FIG. 6 illustrates one example of processing steps that may be used to generate a transformation matrix from Earth centered, Earth fixed (e.g., WGS84) coordinates to inertial J2000 coordinates.

The J2 gravity term represents the lowest zonal harmonic gravity force. Because J2 models the acceleration perturbation caused by a non-spherical Earth, the orientation of the Earth with respect to the inertial J2000 coordinate system is taken into account. This may be accomplished, for example, by first determining the acceleration in the WGS 84 reference frame, then transforming the result to the J2000 reference frame according to the following equations:

$$\underline{a}_{J2}(WGS84) = -J_2 \frac{3\mu}{2r^3} \left(\frac{R_e}{r}\right)^2 \begin{bmatrix} \left(5\frac{z^2}{r^2} - 1\right)x \\ \left(5\frac{z^2}{r^2} - 1\right)y \\ \left(3 - 5\frac{z^2}{r^2}\right)z \end{bmatrix} \quad (7)$$

$$\underline{a}_{J2} = [A]^{WGS84} \underline{a}_{J2}(WGS84)$$

where x, y, and z are the spacecraft position in the WGS84 reference frame, $R_e$ is the radius of the Earth and [A] is the transformation matrix from the WGS84 frame to the J2000 frame. FIG. 6, discussed in more detail below, shows one process that may be used to determine [A].

The lunar and solar gravity perturbations are functions of the sun and moon positions ($R_{sun}$, $R_{moon}$), and are given by:

$$a_i = \mu_i \left( \frac{R_i - R_{sc}}{|R_i - R_{sc}|^3} - \frac{R_i}{|R_i|^3} \right) \tag{8}$$

where the subscript 'i' denotes either the sun or the moon, $\mu_i$ is the gravitational parameter for the sun or moon, and all positions (R vectors) are in the J2000 frame.

Turning now to FIG. 6, that figure illustrates one transformation process 600 for determining the [A] matrix of equation (7). At step 602, the current Julian date is converted to a time of (Earth) day. Thus, the output of step 602 represents where the Earth is in its rotation, and what part of the Earth the spacecraft is above. At step 604, a precession matrix is used to determine the current amount of precession in the motion of the Earth (which sweeps out a conical section approximately every 26,000 years). As the Earth sweeps out the conical section, it further wobbles or oscillates along its path (at a period of approximately 18.6 years). Thus, step 606 uses a nutation matrix to determine the oscillation or nutation parameters of the Earth as is moves through the conical section.

The precessional nutation parameters, Earth rotation, and Julian date are input to step 608 to determine an Earth spin matrix. In addition, the EOP parameters determine, in step 610, the position of the North Pole, which makes a slight contribution to the gravitational effects of the Earth on the spacecraft. Finally, the parameters determined by steps 604–610 are input to step 612, which generates the transformation matrix from WGS84 to J2000 coordinates. The matrices of FIG. 6 are defined in detail in the latest *Supplement to the Astronomical Almanac* published by the U.S. Naval Observatory.

In updating and propagating the state vector, several measurement equations are determined, particularly when a navigation signal arrives. The discrete measurement model of Table 1, according to the present invention, is expressed as a function of the measurements determined using the navigation signal and the preferred state vector and dynamic equation of motion (equations (1) and (3)).

In particular, the measured pseudorange $p_m$ measures the range between a navigation beacon and the spacecraft. It is a "pseudo" range because the range calculation (below) is actually a scaled difference in apparent times. As an example, the pseudorange may be determined in the receiver 102 by using a delay lock loop that uses a correlator circuit or processor to determine the maximum correlation between the incoming signal and a reference signal. The range rate (p-dot), as noted above, may be calculated by the Doppler shift in the incoming navigation signal due to receiver (user) and beacon motion. The measurement model is:

$$z_k = \begin{bmatrix} \rho_m \\ \dot{\rho} \end{bmatrix} = \underline{h}_k(\underline{X}_k) + \underline{v}_k \tag{9}$$

The measured pseudorange is a function of the true pseudorange and the receiver errors, including noise. Excluding ionospheric and tropospheric effects, the measured pseudorange is the sum of the true pseudorange, relativistic time offset ('c' is the speed of light), and receiver measurement error:

$$\rho_m = \rho_T + c\Delta v + c\epsilon \tag{10}$$

The true range between the spacecraft at time $t_u$ and the navigation beacon at time $t_s$ is given by the norm of the difference in the spacecraft ($R_u$) and navigation beacon ($R_s$) position vectors:

$$r = |R_u(t_u) - R_s(t_s)| \tag{11}$$

The true pseudorange is the true range plus the apparent range due to incorrect clock synchronization between the spacecraft and the navigation beacon:

$$\rho_T = r + cb_u - cb_s \tag{12}$$

where $b_u$ is the offset (bias) in the spacecraft clock and $b_s$ is the offset (bias) in the navigation beacon clock. In sum, the measured pseudorange is:

$$\rho_m = |R_u(t_u) - R_s(t_s)| + cb_u - cb_s + c\Delta v + c\epsilon \tag{13}$$

while the predicted pseudorange (as a function of the filter states) is:

$$\hat{\rho}_m = |\hat{R}_u(t_u) - R_s(t_s)| + c\hat{b}_u + c\Delta v \tag{14}$$

As noted above, the range rate is related to the Doppler shift in the incoming navigation signal. The Doppler shift D between the navigation beacon and the spacecraft is given by:

$$D = -(\underline{V}_u(t_u) - \underline{V}_s(t_s))^T \cdot \frac{\hat{R}_u(t_u) - R_s(t_s)}{|\hat{R}_u(t_u) - R_s(t_s)|} \cdot (L_1/c) \tag{15}$$

where $L_1$ is the navigation beacon transmit frequency (e.g., 1575.42 MHz). The true range rate is the time derivative of the true range:

$$\dot{r} = (\underline{V}_u(t_u) - \underline{V}_s(t_s))^T \cdot \frac{\hat{R}_u(t_u) - R_s(t_s)}{|\hat{R}_u(t_u) - R_s(t_s)|} \tag{16}$$

and the true pseudorange rate is the derivative of the true pseudo range:

$$\dot{\rho}_T = \dot{r} + f_u + f_s \tag{17}$$

where $f_u$ and $f_s$ are the apparent range rate due to drifts in the spacecraft and navigation beacon clocks, respectively. The measured pseudorange rate is:

$$\dot{\rho} = (\underline{V}_u(t_u) - \underline{V}_s(t_s))^T \cdot \frac{\hat{R}_u(t_u) - R_s(t_s)}{|\hat{R}_u(t_u) - R_s(t_s)|} + f_u + f_s + \epsilon_\rho \tag{18}$$

$$= \left( -\frac{D_c}{L_1} + f_u + f_s + \epsilon_\rho \right)$$

Finally, equations (14) and (18), the 2×1 non-linear measurement model term h in equation 9 is given by:

$$\underline{h}_k(\hat{\underline{X}}_k) = \begin{bmatrix} |\hat{R}_u(t_u) - R_s(t_s)| + c\hat{b}_u + c\Delta v \\ -\frac{D_c}{L_1} + f_u \end{bmatrix} \tag{19}$$

The actual propagation of the state vector and the error covariance matrix (step 206 in FIG. 2) may be performed in many ways, one of which uses a third order Runge-Kutta approximation:

$$k_1 = T_s \cdot EOM(t, x) \quad (20)$$

$$\underline{k}_2 = T_s \cdot EOM\left(t + \frac{T_s}{3}, x + \frac{k_1}{3}\right) \quad (21)$$

$$\underline{k}_3 = T_s \cdot EOM\left(t + \frac{2T_s}{3}, x + \frac{2k_2}{3}\right) \quad (22)$$

$$\underline{x} = \underline{x} + \frac{1}{4}\underline{k}_1 + \frac{3}{4}\underline{k}_3 \quad (23)$$

$$t = t + T_s \quad (24)$$

$$A = \begin{bmatrix} 0_{[3\times3]} & I_{[3\times3]} & 0 & 0 \\ \left(\mu \cdot I_{[3\times3]} - \frac{3\underline{r}\underline{r}^T}{\underline{r}^T\underline{r}}\right) & 0_{[3\times3]} & 0 & 0 \\ 0 & & 0 & 1 \\ 0 & & 0 & 0 \end{bmatrix} \quad (25)$$

where $T_s$ is a predetermined time interval through which the state vector (x) is propagated, for example, 1 second, 't' represents the time at which the last propagation occurred, and EOM is a shorthand notation for calculation of the dynamic equations (equation (3)) governing the state vector at a given time t. Note also that the state propagator updates the error covariance matrix P according to the error covariance propagation equation in Table 1, using, as an example, the A matrix in equation (25).

Finally, the actual state update occurs when a navigation signal is available. The state update first computes the filter gain (step 210 in FIG. 2):

$$\Delta\underline{r}_{[3\times1]} = \underline{r}_{pred} - \underline{r}_{beacon} \quad (26)$$

$$\Delta\underline{v}_{[3\times1]} = \underline{v}_{pred} - \underline{v}_{beacon} \quad (27)$$

$$\Delta r = |\Delta\underline{r}| \quad (28)$$

$$\underline{u}_{[3\times1]} = \frac{\Delta\underline{r}}{\Delta r} \quad (29)$$

$$H_{[2\times8]} = \begin{bmatrix} \underline{u}^T & 0_{[1\times3]} & 1 & 0 \\ \frac{[(\underline{u}, \Delta\underline{v})\underline{u} - \Delta\underline{v}]^T}{\Delta r} & -\underline{u}^T & 0 & 1 \end{bmatrix} \quad (30)$$

$$K_{[8\times2]} = PH^T(HPH^T + R)^{-1} \quad (31)$$

where $r_{pred}$ and $r_{beacon}$ are the predicted location of the spacecraft (see equation (14)) and the location of the navigation beacon (provided in the navigation signal), respectively, $v_{pred}$ and $v_{beacon}$ are the predicted velocity of the spacecraft (see equation (18)) and the velocity of the navigation beacon (provided in the navigation signal), respectively, 'u' is a unit vector from the navigation beacon to the spacecraft and R is defined in Table 1.

Then, the state vector and the error covariance matrix P may be updated in accordance with the state estimate update equation and the error covariance update in Table 1:

$$\hat{X}_k^+ = \hat{X}_k^- + K_k(z_k - \hat{z}_k(\hat{X}_k^-)) \quad (32)$$

where the first $z_k$ term in equation (32) is represented by equation (9), and the second $z_k$ term in equation (32) is represented by equation (19), and the error covariance is updated according to:

$$P_k^+ = (I - K_k H_k) P_k^- \quad (33)$$

It is further noted that the navigation solution presented above may be applied to other areas, including guidance. Thus, for example, a spacecraft may establish predetermined guidance solutions (including position, velocity, and time information, for example) at various points along a desired trajectory. An onboard guidance system may then use the contents of the predicted state vector as a current navigation solution and compare the navigation solution against the guidance solutions. In response, the spacecraft may generate trajectory adjustments, if necessary, by issuing the appropriate commands to any available propulsion system (e.g., thrusters, solar sails, and the like).

The present navigation method is particularly suited to providing autonomous, real time, self-correcting navigation information for a satellite operated in orbit around the Earth. However, the method provides the same benefits for, and may be used with, virtually any spacecraft. As a second example, a deep space spacecraft (i.e., one operating outside of MEO altitude and not necessarily earth orbiting), may include the present navigation method. Thus, a deep space probe, sent for example, to Saturn, Pluto, or even sent out of the solar system may benefit from the present navigation method. In such a deep space probe, for example, the navigation method may rely on gravitational models not necessarily of the Earth, but of other third bodies, including other planets (and optionally including the perturbations of the Earth and the Sun, as examples).

Note also that the concept of "real time" is not readily reducible to precise definition. However, real time may be regarded to include the scenario in which a spacecraft executes the present navigation method onboard the spacecraft itself, using shared or dedicated processing resources. In other words, a spacecraft applying the present method in real time avoids lengthy delays in transmitting navigation information, for example, to ground based receivers that perform the actual state update and propagation steps and transmit the results to the spacecraft. Although transmission to ground based receivers is certainly one way to implement the present navigation method, real time operation is preferred.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for autonomously determining, given intermittent reception of navigation signals, navigation information for a space vehicle operating in Earth orbit, the navigation information represented by the contents of a state vector, the method comprising the steps of:
   operating a space vehicle in Earth orbit;
   initializing a state vector with navigation information;
   generating a predicted state vector;
   intermittently receiving a navigation signal;
   when the navigation signal is received, updating the state vector based on the current contents of the state vector, the predicted state vector, and the contents of the navigation signal; and propagating the contents of the state vector forward in time by a predetermined time interval, thereby replacing the contents of the predicted state vector;
   when the navigation signal has not been received within a predetermined window time:

autonomously propagating the contents of the predicted state vector forward in time by the predetermined time interval to provide a navigation solution.

2. The method of claim 1, wherein the step of initializing a state vector initializes the state vector with at least position and velocity navigation information.

3. The method of claim 2, wherein at least one of the propagating steps propagates in accordance with a gravity model of the Earth including perturbations of at least the Sun and the Moon.

4. The method of claim 3, wherein at least one of the propagating steps further propagates in accordance with a radiation pressure model.

5. The method of claim 3, wherein the initializing step further initializes the state vector with at least clock bias navigation information, and wherein at least one of the propagating steps further propagates in accordance with a clock model.

6. The method of claim 3, wherein the step of intermittently receiving receives a pseudo-lite navigation signal.

7. The method of claim 3, wherein the step of intermittently receiving receives a GPS navigation signal.

8. The method of claim 3, wherein the step of intermittently receiving receives a GPS navigation signal escaping around the Earth.

9. The method of claim 1, wherein the updating step further comprises the step of determining a self-correcting filter gain and wherein the updating step updates the state vector based in part on the filter gain.

10. The method of claim 1, wherein the updating step further comprises the step of updating an error covariance matrix and wherein at least one of the propagating steps further comprises the step of updating the error covariance matrix.

11. The method of claim 1, further comprising the steps of comparing the navigation solution to a predetermined guidance solution and responsively commanding trajectory adjustments through a propulsion system.

12. The method of claim 1, wherein each of the updating and propagating steps occurs onboard the space vehicle.

13. A method for autonomously determining, given inconsistent reception of navigation signals, navigation information for a deep space vehicle operating beyond MEO altitude, the navigation information represented by the contents of a state vector, the method comprising the steps of:

operating a deep space vehicle beyond MEO altitude;

initializing a state vector with navigation information;

generating a predicted state vector;

intermittently receiving a navigation signal;

when the navigation signal is received, updating the state vector based on the current contents of the state vector, the predicted state vector, and the contents of the navigation signal; and propagating the contents of the state vector forward in time by a predetermined time interval thereby replacing the contents of the predicted state vector;

when the navigation signal has not been received within a predetermined window time:

autonomously propagating the contents of the predicted state vector forward in time by the predetermined time interval to provide a navigation solution.

14. The method of claim 13, wherein the step of initializing a state vector initializes the state vector with at least position and velocity navigation information.

15. The method of claim 14, wherein at least one of the propagating steps propagates in accordance with a gravity model of a third body other than the Earth.

16. The method of claim 15, wherein at least one of the propagating steps further propagates in accordance with a radiation pressure model.

17. The method of claim 15, wherein the initializing step further initializes the state vector with at least clock bias navigation information, and wherein at least one of the propagating steps further propagates in accordance with a clock model.

18. The method of claim 15, wherein at least one of the propagating steps propagates in accordance with a gravity model including perturbations of at least the Earth and the Sun.

19. The method of claim 17, wherein at least one of the propagating steps propagates in accordance with a gravity model including perturbations of at least the Earth and the Sun.

20. The method of claim 15, wherein the step of intermittently receiving receives a pseudo-lite navigation signal.

21. The method of claim 15, wherein the step of intermittently receiving receives a GPS navigation signal.

22. The method of claim 13, wherein the updating step further comprises the step of determining a self-correcting filter gain and wherein the updating step updates the state vector based in part on the filter gain.

23. The method of claim 13, wherein the updating step further comprises the step of updating an error covariance matrix and wherein at least one of the propagating steps further comprises the step of updating the error covariance matrix.

24. The method of claim 15, further comprising the steps of comparing the navigation solution to a predetermined guidance solution and responsively commanding trajectory adjustments through a propulsion system.

25. The method of claim 13, wherein each of the updating and propagating steps occurs onboard the deep space vehicle.

26. The method of claim 13, wherein the step of propagating the contents of the predicted state vector comprises propagating the predicted state vector according to a Runge-Kutta approximation.

* * * * *